March 18, 1952  F. A. QUICK  2,589,959
ELECTRIC MOTOR
Filed April 18, 1950
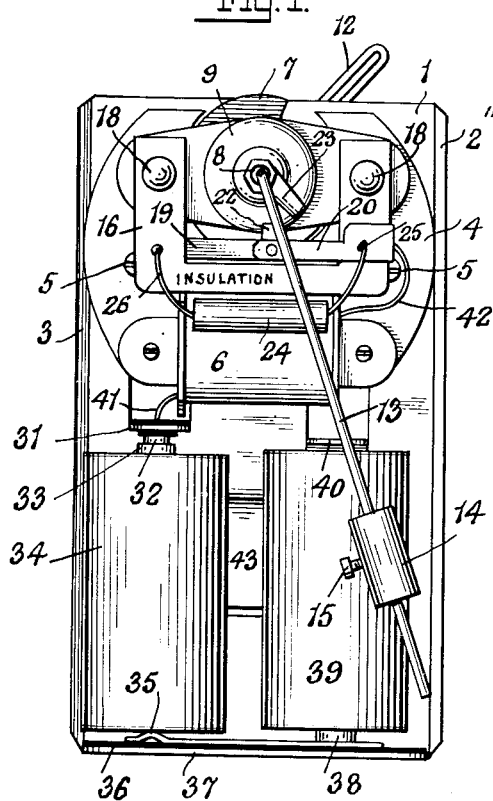
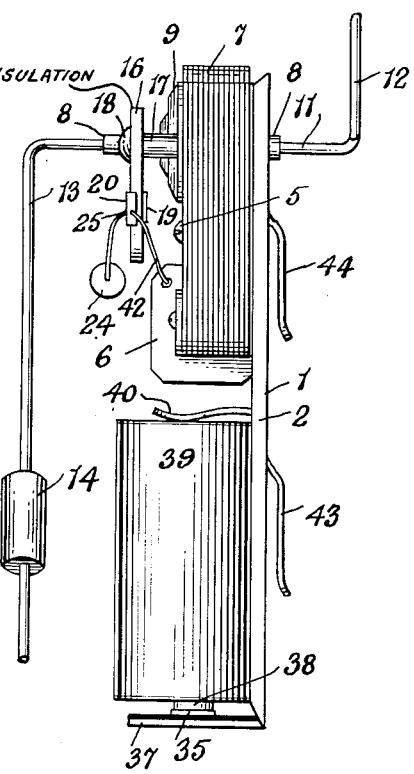
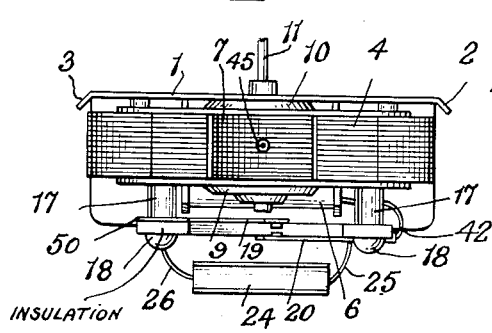
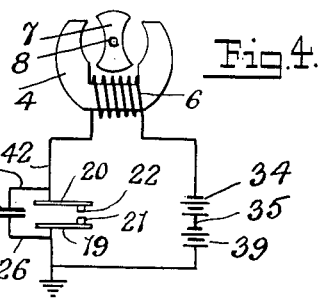
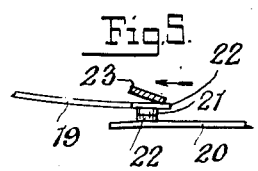
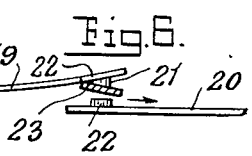
INVENTOR.
Frederick A. Quick
BY
Fritz Ziegler
attorney Patented Mar. 18, 1952

2,589,959

UNITED STATES PATENT OFFICE 2,589,959

ELECTRIC MOTOR

Frederick A. Quick, Bellerose, N. Y., assignor to Gregory Motors, Inc., Brooklyn, N. Y., a corporation of New York Application April 18, 1950, Serial No. 156,656

4 Claims. (Cl. 172—126)

This invention relates to electric motors and particularly to those adapted for use in animated signs and displays and of a type and construction which will enable operation by dry cells at small operating expense.

An object of the invention is to provide a simple, compact structure in which the motor mount, the batteries for powering the motor, and associated parts will be carried in a unitary fashion, permitting the device to be readily set up in an advertising display and operated at a minimum of expense from dry batteries.

Another object of the invention is to provide a power unit for advertising devices, of a unitary construction enabling it to be readily removed from one advertising device and readily applied to another without skill or without the use of tools.

Still another object is to provide a simple, compact and efficient power unit, operating for a relatively long period on small, easily-replaceable dry cells, capable of being installed in any advertising device simply and speedily, and having numerous other advantages apparent to those skilled in this art.

With these and other objects to be hereinafter set forth, in view, I have devised the particular arrangement of parts disclosed below and more particularly pointed out in the claims appended hereto.

In the accompanying drawing, wherein an illustrative embodiment of the invention is disclosed, Fig. 1 is a face view of the improved power unit, looking at the rear of the same; Fig. 2 is a side elevation, looking from the right of Fig. 1; Fig. 3 is a top plan view of the unit, with certain parts broken away to disclose construction; Fig. 4 is a diagrammatic or schematic view of the wiring diagram; Fig. 5 shows the switch leaves having their points closed by the action of the switch-operating member, and Fig. 6 is a similar view, but showing the switch being opened by movement of the switch-operating member in a direction reverse to that shown in Fig. 5.

Referring to the drawing, I indicates the base plate of the power unit, the same being of relatively thin sheet metal stiffened or reinforced at its side edges by the inwardly-bent flanges indicated at 2 and 3. The stator 4 of the motor, composed of a plurality of similar, substantially C-shaped plates or laminae is secured to the inner face of the plate I by means of the screws 5. The motor coil or winding 6 extends around the stator cross-piece.

The rotor or armature 7 of the motor is of the shuttle type and is provided with a hollow shaft 8 to which it is secured, and said shaft is rotatively mounted in bearings 9 and 10 attached by screws 18 to the opposite faces of the stator 4. Secured in the hollow shaft 8 by set screw 45 (Fig. 3) is the crank member 11 in the form of a rod bent downwardly at its inner end as indicated at 13, said downbent portion 13 receiving a slidably adjustable weight or counter-balance 14 arranged to be set at any desired location on the rod portion 13 for balance, by means of the set-screw 15.

The opposite end of the rod 11 is upturned and looped into the arm 12 adapted to receive that portion of the display device which is to be moved or animated with a swinging or oscillatory movement by operation of the motor.

A U-shaped bracket 16, composed of insulating material, is supported by the screws 18 between the heads of said screws and spacing bushings 17 interposed between the bracket 16 and the rear face of the stator 4. This arrangement is such as to maintain the bracket 16 spaced away from the stator at the rear of the same. Secured to the vertical arms of the bracket 16 are the switch leaves 19 and 20, which are of bronze or similar material having a relatively high degree of resiliency, the leaf 19 having a vertical extension 50 which contacts with one of the bushings 17 and thus electrically grounds the leaf 19 to the motor and plate 1. The leaf 20 is secured only to the insulated bracket 16 and is thus insulated from the motor, frame or other surrounding metallic parts of the structure.

The coil or winding 6 of the motor has one end connected, by the lead wire 42, to the leaf 20 and its other end is connected by the lead wire 41 to the positive terminal 33 of a dry cell 34 of the flashlight type, through a contact disk 32 carried by but insulated from a lug 31 stamped out and protruding rearwardly from the plate 1. The negative terminal or metal case of the battery 34, rests against a contact strip 35 supported on an insulating liner 36 secured to the upper face of a horizontal ledge or flange 37 formed at the lower end of the base plate 1 and extending rearwardly therefrom. The springiness in the flange or ledge 37 and in the lug 31 tends to hold the battery in position as clearly shown in Fig. 1. A second battery, shown at 39 has its positive terminal 38 in contact with the contact strip 35 and its negative terminal or metal case in contact with a springy lug 40 stamped out of the base plate 1. This arrangement is such as to hold the second battery, or that shown at 39, in place on the plate 1 and to electrically ground the negative terminal thereof to the base plate 1.

A fixed condenser 24 has one side connected at 25 to the switch leaf 20 and its other side connected at 26 to the switch leaf 19. Leaf 19 is provided with the contact point 21, while an opposed contact point 22 is carried by the leaf 20. Normally, these contact points 21 and 22 are separated or spaced apart so that the circuit is normally open to prevent drain on the batteries. The points 21 and 22 are adapted to be brought into contact to close the circuit, by a swing of the shaft 8 in one direction and opened by a swing of the shaft in the opposite direction. For this purpose, the shaft 8 carries a radially-extending switch actuator or wiper 23 which has a slanted or inclined blade surface, clearly seen in Figs. 5 and 6. This blade surface is so arranged that when the rod portion 13 swings to the left, or in the direction of the arrow in Fig. 5, the actuator blade 23 will wipe against the rear face of an upwardly-extending projection or tongue 22 provided at the end of the leaf 19, and flex said leaf in a direction toward the leaf 20 to close contact between the points 21 and 22 as shown in Fig. 5. When the actuator 23 swings to the left to an extent sufficient to pass beyond the tongue 22 the leaf 19 will then spring away from the leaf 20 and the circuit will be broken. When the actuator swings in a reverse direction, or to the right in the direction of the arrow shown in Fig. 6, it will wipe against the opposite face of the tongue 22 and will flex the leaf 19 away from the leaf 20 and thus assure the breakage of contact between the two points 21 and 22 and the resultant opening of the circuit.

From the foregoing, the operation of the improved power unit will be readily understood. Stamped from the plate 1 and extending forwardly thereof, is a plurality of spring tongues 43 and 44, which can be employed to detachably connect the power unit to an advertising display in a location and manner to position the swinging arm 12 at the required point to enable it to move the portion of the display that is carried by it through the required arc. When the operation of the motor is started by a swing imparted to the portion 13 of the rod or crank, the circuit to the motor will be closed by the actuator closing contact between the points 21 and 22 as shown in Fig. 5. On its return swing, the actuator will open the circuit as shown in Fig. 6 and this opening and closing of the circuit will continue operation of the motor in the known manner, causing swing or oscillation of the parts 12 and 13 as long as there is current remaining in the batteries which, in the construction shown, is surprisingly long.

While the device is primarily adapted for oscillating movement of the arm 12, it can be operated as a rotary motor by proper counterbalancing of the motor shaft, as will be readily apparent. Since the batteries and all parts of the device are carried and supported by a single base plate, the device is unitary, relatively light-weight and can be handled and installed with a minimum of effort. Since its attachment to a display is facilitated by the clips or tongues 43 and 44, it can be readily shifted as a unit from one display to another.

While I have herein described one embodiment of the invention, it is obvious that the same is not to be restricted thereto, but is broad enough to cover all structures coming within the scope of the annexed claims.

What I claim is:

1. A power unit for animated displays, comprising a base plate, a motor attached to a face of the same, said motor including a rotor having a shaft, a bracket carried by the motor, switch leaves carried by the bracket, said leaves having contact points, a switch actuator carried by the motor shaft and operative upon one of the switch leaves when said shaft is swung in one direction to close contact between the points and operative upon said leaf when swung in an opposite direction to separate the points, flanges formed on the plate for supporting batteries, connections between said batteries and the motor and switch, and means carried by the plate for supporting the same and attached motor and batteries from a display sheet.

2. A power unit comprising a plate, a substantially C-shaped stator mounted thereon, a rotor within the stator, a winding carried by the stator, an insulated bracket carried by the stator, switch leaves mounted on said bracket, contact points carried by the switch leaves, the rotor having a shaft, a switch actuator comprising a finger projecting radially from the shaft and operative against one of the switch leaves on swing in either direction, batteries carried by the plate and connections between the batteries and the switch and winding to close circuit to the winding upon swing of the switch actuator in one direction.

3. A power unit comprising a plate, a motor attached to a face of the plate, batteries carried by the plate, a switch including a pair of spring leaves, a bracket carried by the motor on which said leaves are mounted, the motor having a shaft on which a switch actuator is carried, said actuator being effective to close circuit between the leaves when moved in one direction and open circuit between the same when moved in an opposite direction.

4. In a power unit as provided for in claim 3, wherein the plate is provided with clips by which the plate, motor and batteries may be supported as a unit on a display device.

FREDERICK A. QUICK.

REFERENCES CITED

The following references are of record in the file of this patent:

UNITED STATES PATENTS

| Number | Name | Date |
|---|---|---|
| 741,371 | Powell | Oct. 13, 1903 |
| 2,056,674 | Ingersoll | Oct. 6, 1936 |
| 2,301,147 | Schaaf | Nov. 3, 1942 |